Dec. 26, 1967  J. J. GAMBLE  3,359,928

COMBINED FISHING ROD HOLDER AND SEAT

Filed June 2, 1967

INVENTOR
James J. Gamble
BY B. P. Fishburn, Jr.
ATTORNEY

United States Patent Office 3,359,928
Patented Dec. 26, 1967

3,359,928
COMBINED FISHING ROD HOLDER AND SEAT
James J. Gamble, P.O. Box 442,
Kingstree, S.C. 29556
Filed June 2, 1967, Ser. No. 643,113
5 Claims. (Cl. 108—50)

ABSTRACT OF THE DISCLOSURE

A foldable and readily portable fisherman's seat and rod or pole support which allows the rod or pole to be supported at various elevations.

Background of the invention

The need for the invention arises from the desire of fishermen for a simplified seat upon which they may rest while fishing along a stream, together with some means for supporting the rod or pole at various elevations.

The prior art reveals a number of devices for supporting fishing rods and other devices which may serve as a seat. There is no convenient device available, however, which is readily foldable to a flat compact position for ease of carrying and being capable, when set up, of serving as a seat and a rest or support for the rod or pole at various elevations. The present invention accomplishes this in a simplified and sturdy structure.

Summary of the invention

The invention consists of a flat base member having a fisherman's seat or stool hinged thereto near one end thereof and adapted to be folded down onto the base member when not in use. Plural fishing rod support devices are hinged to the base member and also swingable thereon between active and inactive positions. These devices may support one or more poles or rods at various heights.

Description of the preferred embodiment

Figure 4:
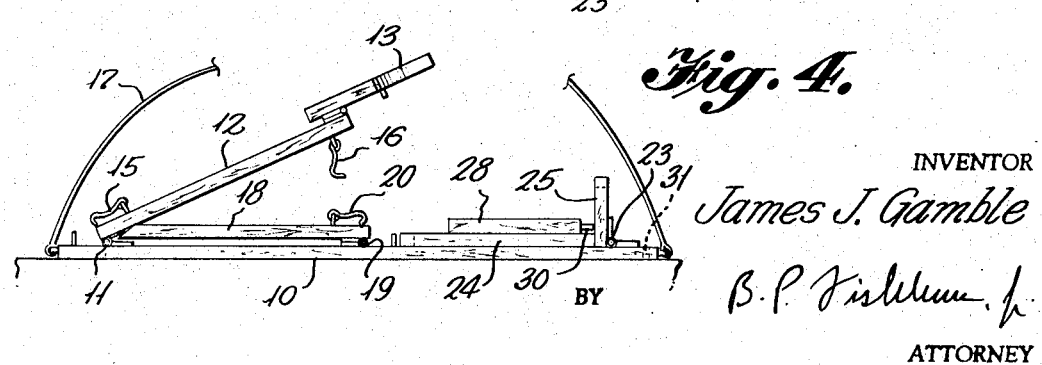
FIGURE 4 is a side elevational view of the invention in the folded position, ready for carrying.

Referring to the drawing, wherein like numerals designate like parts, the numeral 10 designates a flat elongated base member or plate conveniently formed from a wooden plank. Near the rear end of the base member 10 and hinged thereto by means of a suitable hinge 11 is an upright pedestal or support post 12 carrying a seat 13 at its upper end, the seat being hinged to the top of the pedestal by a hinge 14. The pedestal 12 is releasably secured in the upright or active position by a releasable fastener means 15 which may conveniently take the form of a simple hook and eye. Similarly, a hook and eye fastener 16 or some like means is employed to secure the seat 13 in its active position at right angles to the upright pedestal 12. The elements 12 and 13 are also conveniently formed of wood, although any desired material may be utilized for the invention. The seat structure is readily foldable to a non-use carrying position, as shown in FIGURE 4, and to facilitate carrying the invention, a study carrying strap 17 has its opposite ends anchored to the ends of the base member 10, as shown.

Figure 3:
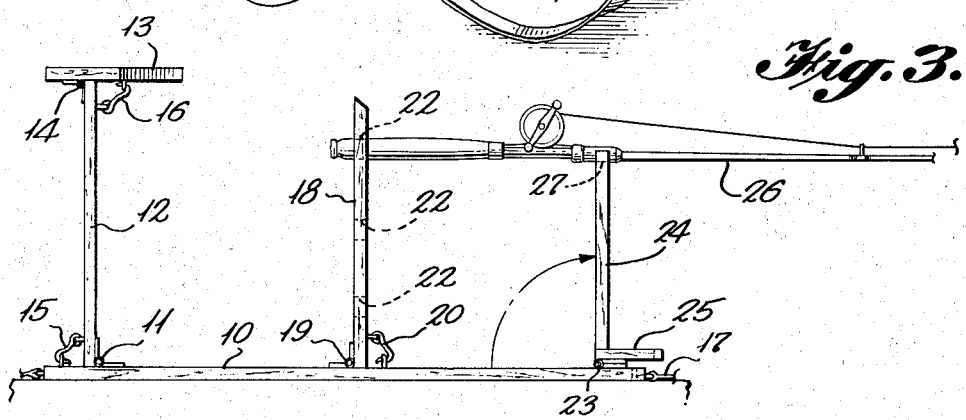
FIGURE 3 is a side elevation thereof.

An intermediate fishing pole or rod rest member or support 18 is hingedly secured at 19 to the base member near the longitudinal center thereof and well forwardly of the seat structure. The support 18 may also be made from wooden planking and is secured releasably in the upright position by a hook and eye fastener 20. As shown in FIGURE 4, the intermediate support 18 is readily foldable downwardly to a non-use position substantially parallel to the base member 10. The intermediate support 18 has a plurality of horizontal rows of support openings 21 and 22 formed therethrough for the reception of fishing rod handles or the butt ends of fishing poles, generally as illustrated in FIGURE 3. The openings 22 are larger than the openings 21 to accommodate large sized poles or rod handles, as required. The several rows of openings in the support 18 render it possible to support a number of the poles or rods simultaneously, if desired. For illustration purposes, FIGURE 3 shows a single fishing rod being supported by the device of the invention.

Figure 1:
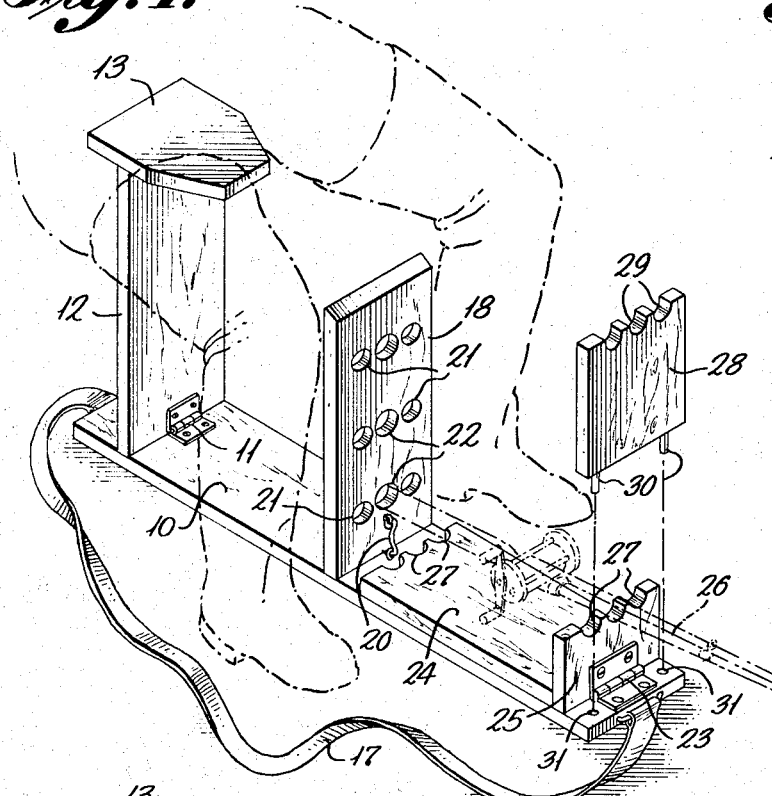
FIGURE 1 is a perspective view of the invention illustrating the use thereof.
Figure 2:
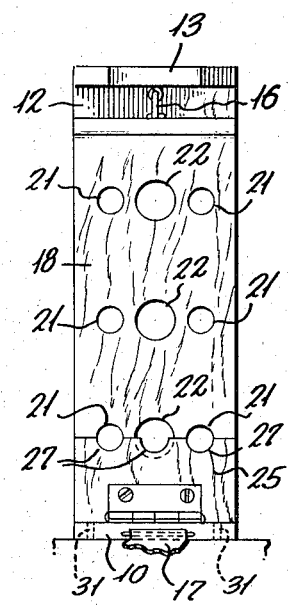
FIGURE 2 is an end elevational view of the invention.

Near the forward end of the base member 10 and hinged thereto for vertical swinging movement by another hinge 23 is an L-shaped forward rod rest or support having a long leg 24, slightly shorter than the support 18, and a short leg 25. Since the legs 24 and 25 are rigidly connected together at right angles, one leg will be in the down or inactive position when the other leg is upstanding and active, parallel to the support 18 and perpendicular to the base member 10. FIGURES 1 and 2 show the short leg 25 in the active position for supporting a rod 26 at a low elevation whereas FIGURE 3 shows the leg 24 in the active upright position for supporting the rod 26 at a higher elevation. FIGURE 4 shows the longer leg 24 folded down upon the flat base member 10 for ease of carrying by means of the strap 17.

As shown, both of the legs 24 and 25 have semi-circular notches 27 formed in their top edges to receive the fishing pole or rod well forwardly of the intermediate support 18. When the longer leg 24 is used, the uppermost row of support openings 21 and 22 of the intermediate support 18 are employed, and when the lower leg 25 is used, FIGURE 1, the lowermost row of openings 21 and 22 are utilized.

To render the invention even more useful in supporting poles or rods at various heights, an auxiliary rest 28 in the form of a plate-like section of wood or the like is provided, having a height somewhat greater than the leg 25 but less than the long leg 24. The rest 28 has notches 29 in its upper edge to coact with the center row of openings 21 and 22 of the support 18 so that a rod or rods can be held at an intermediate elevation. The rest 28 has depending dowel pins projecting from its bottom, adapted to enter support openings 31 formed in the base member 10 at its forward end, directly ahead of the L-shaped rest 24–25. The location of the auxiliary rest 28 is shown in FIGURE 1 where the rest 28 is in alignment with the openings 31. When the rest 28 is utilized, the long leg 24 must be in the folded position with the short leg 25 upright. FIGURE 4 shows the auxiliary rest 28 lying flat on the leg 24 when the device is folded for carrying or storage.

In light of the foregoing description, it is thought that the utility and the operation of the invention will be readily apparent to anyone skilled in the art.

It is to be understood that the form of the invention shown and described herewith is to be taken as a preferred example of the same, and that various changes in the shape, size and arrangement of parts may be resorted to, without departing from the spirit of the invention or scope of the subjoined claims.

I claim:
1. A fisherman's seat and rod supporting structure comprising in combination, a plate-like base member to rest upon the ground and being elongated, a seat secured hingedly to the base member near one end thereof and having an erect use position and a folded-down non-use posi- tion, an intermediate rod support member hingedly secured to the base member substantially forwardly of the seat and having an erect use position and a folded-down non-use position, said intermediate rod support member having plural groups of rod supporting openings at plural elevations, and a forward rod rest member hingedly secured to the base member near the forward end thereof remote from the seat and substantially forwardly of the intermediate rod support member, said rest member including rod receiving recesses for substantial alignment with plural groups of said rod supporting openings, whereby rods may be bodily supported by the intermediate member and rest member.

2. A fisherman's seat and rod supporting structure in accordance with claim 1, wherein said rest member is L-shaped including a relatively long leg and a relatively short leg arranged substantially at right angles, each leg having rod engaging notches in its free end alignable substantially with some of said openings in the intermediate rod supporting member, each of said legs having an erect active position and a folded-down position upon said base member.

3. A fisherman's seat and rod supporting structure in accordance with claim 1, and releasable latch means for securing said seat, intermediate rod support and forward rest member in their erect use positions.

4. A fisherman's seat and rod supporting structure in accordance with claim 3, and a flexible element secured to the opposite ends of the base member to facilitate carrying the structure when said seat, intermediate support member and rest member are folded-down onto the base member.

5. A fisherman's seat and rod supporting structure in accordance with claim 2, and an auxiliary rod supporting rest mountable upon the forward end of the base member and being upright and having notches in its top to engage rods and having a height less than said relatively long leg but greater than said short leg, said auxiliary rest disposed forwardly of said L-shaped rest member during use while said long leg is folded down and the short leg is erect.

References Cited
UNITED STATES PATENTS

| | | | |
|---|---|---|---|
| 371,777 | 10/1887 | McCabe | 248—42 XR |
| 1,406,571 | 2/1922 | McCoy | 297—188 |
| 1,891,163 | 12/1932 | Kabele | 248—42 |
| 2,555,073 | 5/1951 | Zdankoski | 297—188 XR |
| 2,645,050 | 7/1953 | Golias | 248—42 XR |
| 2,774,563 | 12/1956 | Pribis | 248—46 |

BOBBY R. GAY, *Primary Examiner.*

G. O. FINCH, *Assistant Examiner.*